(12) United States Patent
Renoud et al.

(10) Patent No.: US 8,931,337 B2
(45) Date of Patent: Jan. 13, 2015

(54) FLUID METER, IN PARTICULAR FOR WATER

(71) Applicant: Itron France, Issy-les-Moulinaux (FR)

(72) Inventors: Anthony Renoud, Issy-les-Moulinaux (FR); Sebastien Schwenter, Issy-les-Moulinaux (FR)

(73) Assignee: Itron France, Issy-les-Moulinaux (FR)

( * ) Notice: Subject to any disclaimer, the term of this patent is extended or adjusted under 35 U.S.C. 154(b) by 0 days.

(21) Appl. No.: 13/646,464

(22) Filed: Oct. 5, 2012

(65) Prior Publication Data

US 2013/0091945 A1     Apr. 18, 2013

(30) Foreign Application Priority Data

Oct. 6, 2011   (EP) ..................................... 11306291

(51) Int. Cl.
| | |
|---|---|
| *G01F 15/02* | (2006.01) |
| *G01F 15/06* | (2006.01) |
| *G01F 15/00* | (2006.01) |
| *G01F 15/14* | (2006.01) |
| *G01D 4/00* | (2006.01) |
| *G01D 11/26* | (2006.01) |

(52) U.S. Cl.
CPC ............ *G01F 15/063* (2013.01); *G01F 15/007* (2013.01); *G01F 15/14* (2013.01); *G01D 4/002* (2013.01); *G01D 11/26* (2013.01); *Y02B 90/241* (2013.01); *Y02B 90/243* (2013.01); *Y04S 20/32* (2013.01); *Y04S 20/325* (2013.01); *Y04S 20/36* (2013.01)
USPC ............ 73/198; 73/272 A; 73/272 R; 73/273; 73/275

(58) Field of Classification Search
CPC .............................. G01F 15/061; G01F 15/063
USPC ...................... 73/198, 272 R, 272 A, 273, 275
See application file for complete search history.

(56) References Cited

U.S. PATENT DOCUMENTS

| | | | |
|---|---|---|---|
| 5,214,587 A * | 5/1993 | Green ............................. 702/60 |
| 6,853,309 B1* | 2/2005 | Schroter .................. 340/870.02 |
| 7,290,456 B2* | 11/2007 | Sallee ........................ 73/861.52 |
| 7,412,882 B2* | 8/2008 | Lazar et al. ..................... 73/273 |
| 2003/0028333 A1* | 2/2003 | Olson ............................ 702/45 |
| 2004/0209524 A1* | 10/2004 | Ely ............................... 439/700 |
| 2005/0000302 A1 | 1/2005 | Winter |

(Continued)

FOREIGN PATENT DOCUMENTS

DE       102005051159 A1    4/2007

OTHER PUBLICATIONS

EP Search Report, EP 11 30 6291, Jan. 13, 2012, 2 pages.

*Primary Examiner* — Lisa Caputo
*Assistant Examiner* — Philip Cotey
(74) *Attorney, Agent, or Firm* — Lee & Hayes, PLLC

(57) ABSTRACT

A fluid meter includes a totaliser having an electronic card that communicates with a remote meter reading system. The electronic card may be contained in a metal housing covered in a leakproof manner by an upper transparent panel. The totaliser may be covered by a cover which retains the upper transparent panel in a leakproof manner. The cover may be covered by a cap made from plastic material. The upper transparent panel may be made from glass and the upper transparent panel and the cover may each include an orifice to allow communication between the electronic card and antenna disposed between the cover and the cap.

20 Claims, 3 Drawing Sheets

(56) References Cited

U.S. PATENT DOCUMENTS

| | | |
|---|---|---|
| 2005/0066746 A1 | 3/2005 | Winter |
| 2005/0230040 A1* | 10/2005 | Walding et al. ................. 73/201 |
| 2006/0032317 A1* | 2/2006 | Furmidge et al. ........... 73/861.19 |
| 2008/0209985 A1* | 9/2008 | Winter ....................... 73/40.5 R |
| 2009/0255346 A1* | 10/2009 | Hendey et al. ............. 73/861.77 |
| 2010/0026515 A1* | 2/2010 | Lazar et al. .............. 340/870.02 |
| 2011/0107845 A1* | 5/2011 | Gabriel et al. ............. 73/861.11 |
| 2011/0178733 A1* | 7/2011 | Seehoffer et al. ................ 702/45 |
| 2011/0303311 A1* | 12/2011 | Klicpera ....................... 137/551 |
| 2012/0227511 A1* | 9/2012 | Davis et al. ................ 73/861.78 |
| 2012/0305084 A1* | 12/2012 | Ball et al. ........................... 137/1 |
| 2013/0036834 A1* | 2/2013 | Abdul-Hadi et al. ...... 73/861.78 |

* cited by examiner

FLUID METER, IN PARTICULAR FOR WATER

This Application claims priority to European Application EP 11306291.3, filed 6 Oct. 2011, which is incorporated herein by reference.

The invention relates to a fluid meter, in particular for water.

Conventionally, a fluid meter, in particular for water, includes a reservoir provided with an inlet duct and an outlet duct for water and contains a measurement chamber which may be a turbine measurement chamber, an oscillating piston measurement chamber or a static measurement chamber, for example an ultrasonic measurement chamber. A totaliser which makes it possible to determine the flow rate or the volume of water passing through the reservoir is mounted and connected on this reservoir. This totaliser includes various electrical, mechanical and electronic elements and is contained in a cover, generally made from plastic material, which ensures that it is retained and which includes a window for viewing a metering screen, generally a liquid crystal display.

This cover in turn is covered with a cap which bears markings specific to the meter, ensures tamper-proof operation and has an external window for viewing the screen.

The totaliser may include an electronic card for remote meter reading bearing the screen and contained in a metal housing covered in a sealed manner by an upper transparent panel which ensures that the screen can be viewed through the viewing windows.

In order to ensure the remote meter reading by radio frequencies, an antenna should be provided which is connected to the remote meter reading system of the electronic card.

Moreover, the upper transparent panel is conventionally made from plastic material. In the case of operation of the meter in a difficult environment, in particular when the meter is capable of being immersed in water, the plastic material does not remain leakproof over an acceptable service life.

The invention solves these problems by proposing a meter which is perfectly leakproof and which can enable remote meter reading by means of an antenna.

In order to do this, the invention proposes a fluid meter, in particular for water, comprising a totaliser having an electronic card including a remote meter reading system using radio waves and contained in a metal housing covered in a leakproof manner by an upper transparent panel, this totaliser being covered by a cover which retains the said upper transparent panel in a leakproof manner and the said cover being covered by a cap made from plastic material, this meter being characterised in that the said upper transparent panel is made from glass and the said upper transparent panel and the said cover include an orifice in which is disposed a watertight arrangement for transmission of radio waves from the said electronic card towards an antenna disposed between the said cover and the said cap.

According to a preferred embodiment, the said antenna is fixed to a metal insert secured in a leakproof manner on the said upper transparent panel by means of a screw disposed in the said orifices and connected to the remote meter reading system of the said electronic card.

Preferably, it includes a sealing joint inserted between the said insert and the said glass panel.

The said sealing joint is advantageously overmoulded on the said cover.

The meter preferably includes a second sealing joint inserted between the said cover and the said cap.

The said two joints are advantageously overmoulded on the said cover by means of a channel linking them.

The said screw can be connected by a spring-loaded contact to the said remote meter reading system of the said electronic card.

The invention is described below in greater detail with the aid of drawings which only show a preferred embodiment of the invention.

Figure 1:
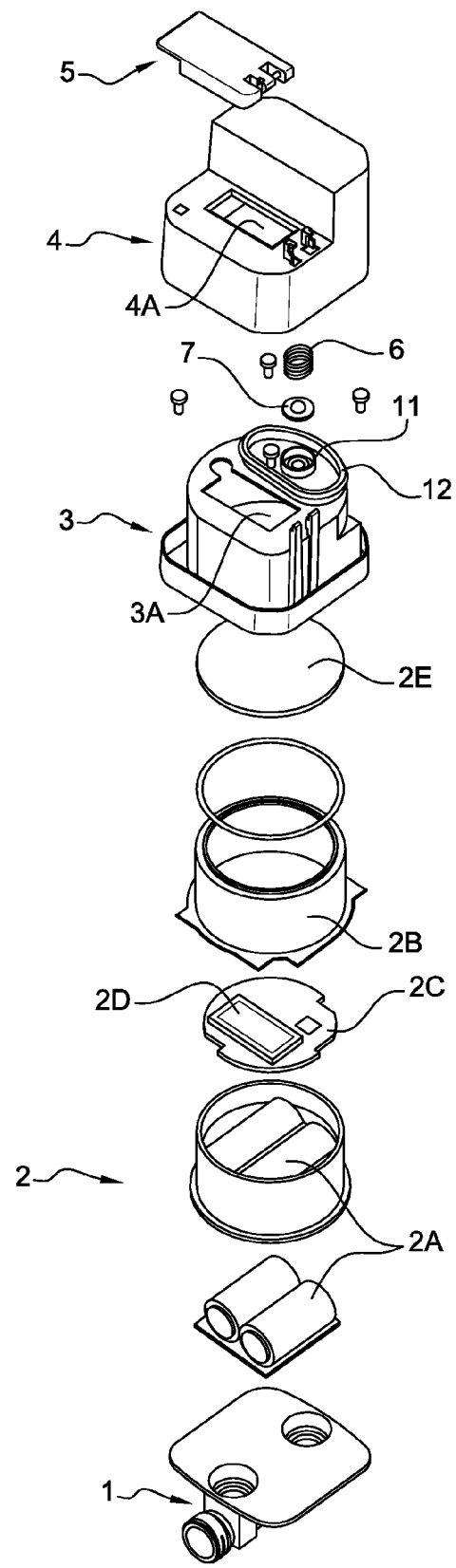
FIG. 1 shows an exploded perspective view of a meter according to the invention.

The following description considers the orientation illustrated in the drawings in order to define the relative positioning of the different elements, for example upper or lower elements.

Figure 2:
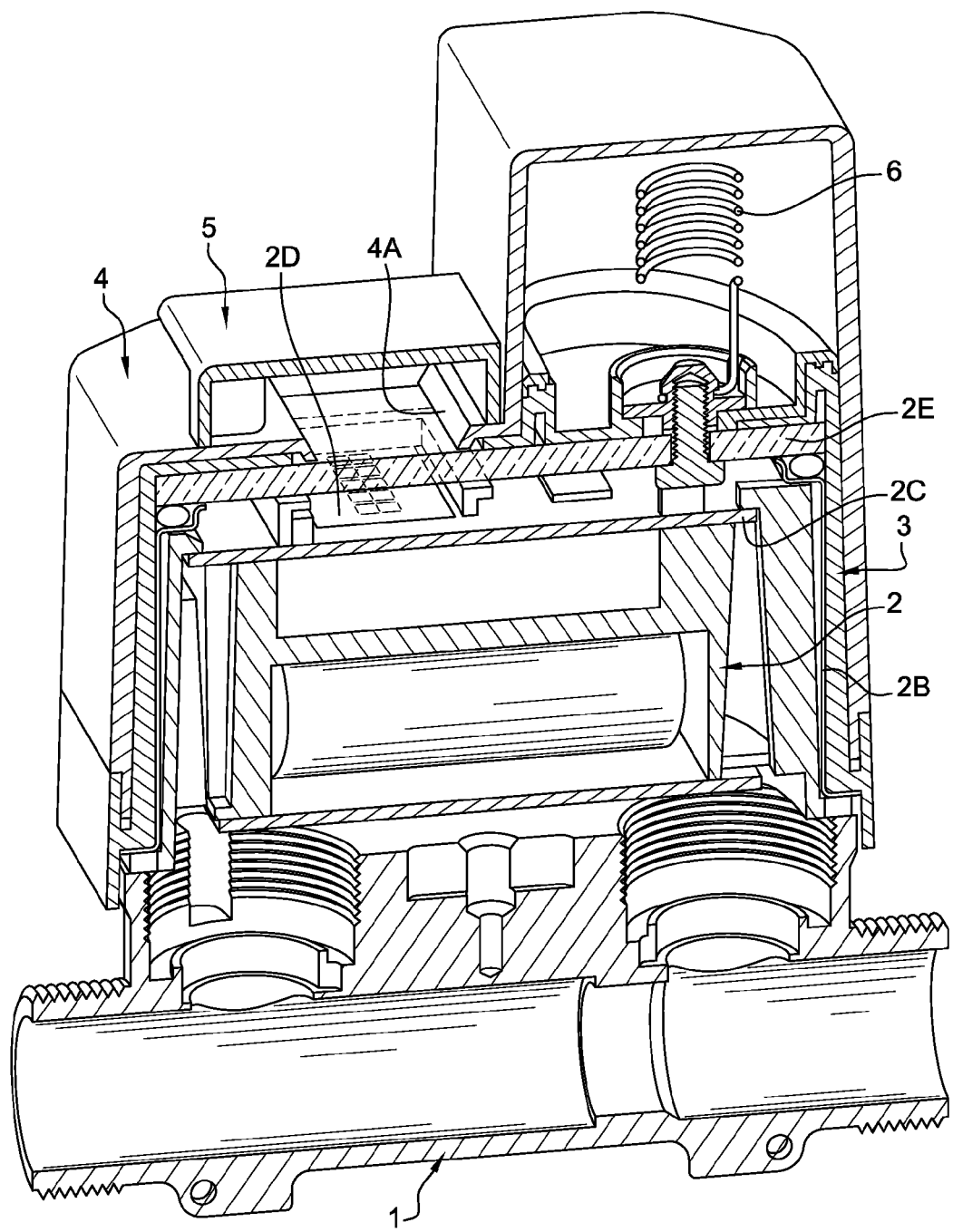
FIG. 2 shows a sectional perspective view of a meter according to the invention.

As shown in FIG. 1 in an exploded position and in FIG. 2 in an assembled position, a fluid meter, in particular for water, includes a reservoir 1 provided with an inlet duct and an outlet duct for water and contains a measurement chamber which may be a turbine measurement chamber, an oscillating piston measurement chamber or a static measurement chamber, for example an ultrasonic measurement chamber. A totaliser 2 which makes it possible to determine the flow rate or the volume of water passing through the reservoir is mounted and connected on this reservoir 1. This totaliser 2 includes various electrical, mechanical and electronic elements 2A and is contained in a metal housing 2B, and includes an electronic card 2C including a system for remote meter reading by radio waves also including a metering screen 2D, preferably a LCD screen, covered by a transparent panel 2E.

This totaliser 2 is covered by a cover, generally made from plastic material, which ensures that it is retained and which includes a window 3A for viewing the screen 2D.

Finally, this cover in turn is covered with a cap 4 which bears markings specific to the meter, ensures tamper-proof operation and also has an external window 4A for viewing the screen 2D. It contains a remote meter reading antenna 6 as will be seen below.

A screen cover 5 is mounted on the cap 4 in order to cover and protect this screen from ultraviolet rays and to protect this external window 4A in order to prevent the introduction of external elements such as mud or dust.

In order to ensure optimal sealing whilst enabling correct transmission of radio waves by means of the antenna 6, the upper transparent panel 2E is made from glass and this upper transparent panel 2E and the cover 3 include an orifice in which is disposed a leakproof arrangement for transmission of radio waves from the electronic card 2C to the antenna 6 disposed between the cover 3 and the cap 4.

Figure 3:
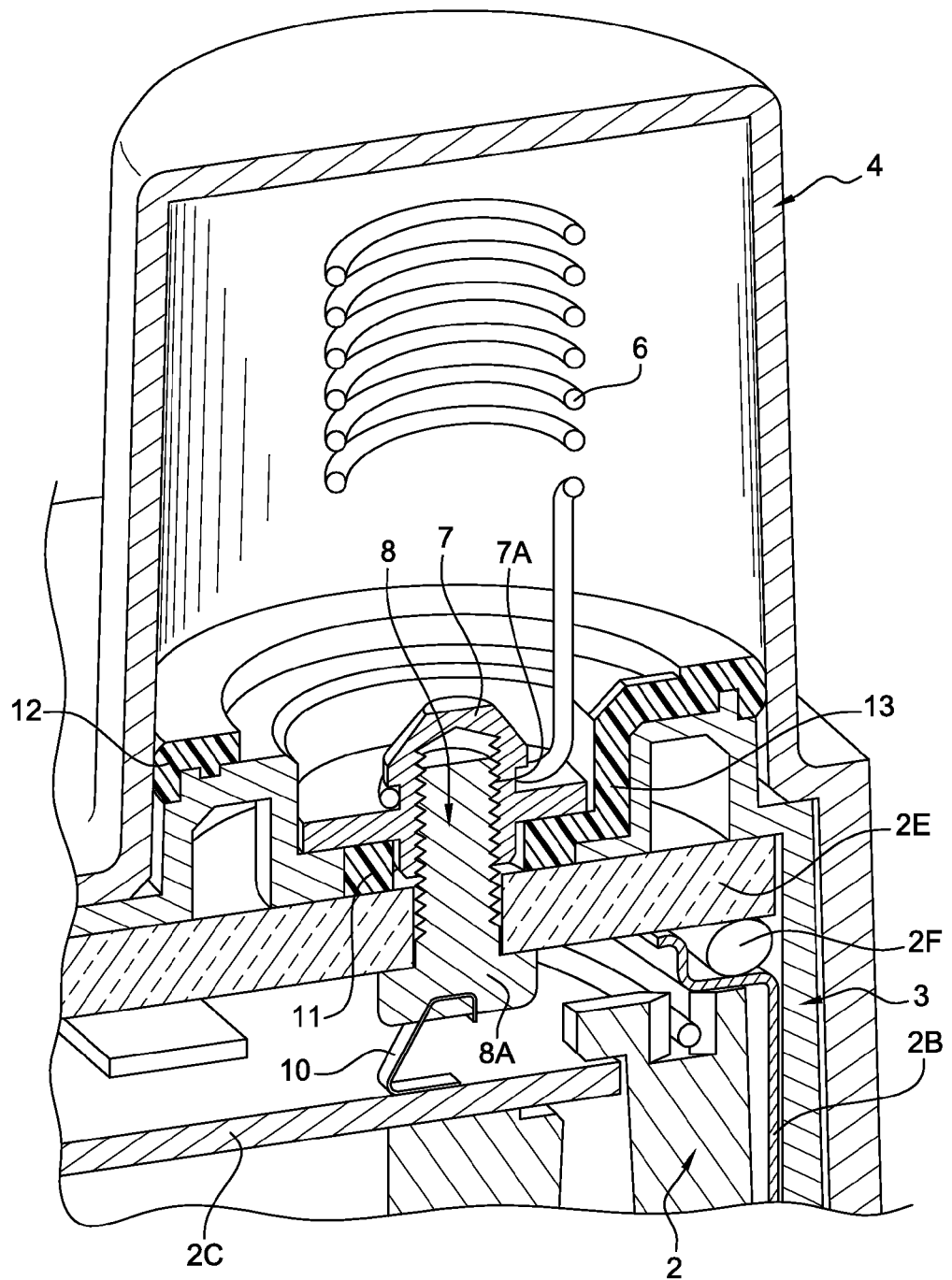
FIG. 3 shows a partial sectional perspective view of a meter according to the invention.

This arrangement is shown in greater detail in FIG. 3.

The glass panel 2E covers the metal housing 2B with an O ring 2F inserted for sealing.

The cap 4 includes an upper protrusion intended to contain the antenna 6.

The antenna 6, which in this case is helical, is inserted by its end turn on the groove of a metal insert 7 secured in a leakproof manner on the upper transparent panel 2E by means of a screw 8 disposed in the orifice of this upper transparent panel 2E and of the cover 3 and connected to the remote meter reading system of the electronic card 2C. In order to do this, the insert 7 has a tapping 7A and the screw 8 is screwed there with its head 8A disposed below the upper transparent panel 2E. This head 8A is preferably connected by a metal spring-loaded contact 10 to the remote meter reading system of the electronic card 2C.

A first sealing joint 11 is inserted between a radial flange of the insert and the glass panel 2E, ensuring sealing between these elements and the cover 3. For this purpose it is advantageously overmoulded on the edge of the orifice of the cover 3.

A second sealing joint 12 is inserted between the cover 3 and the cap 4 and is advantageously also overmoulded on an upper wall of the cover 3.

In order to facilitate the production of these two joints 11, 12, a channel 13 connects them and these two joints are shaped by one single overmoulding operation.

The invention claimed is:

1. A fluid meter, comprising a totaliser having an electronic card including a remote meter reading system contained in a metal housing covered in a leakproof manner by an upper transparent panel, the totaliser being covered by a cover which retains the upper transparent panel in a leakproof manner and the cover being covered by a cap made from plastic material, the upper transparent panel being made from glass and the upper transparent panel and the cover both including a respective aperture through which is disposed a watertight arrangement for transmission from the electronic card to an antenna, wherein the watertight arrangement comprises a metal insert secured on the upper transparent panel by a fastener, and wherein the antenna and the electronics card are on opposite sides of the upper transparent panel.

2. The fluid meter as claimed in claim 1, wherein the antenna is fixed to the metal insert and secured in a leakproof manner on the upper transparent panel by means of the screw and connected to a remote meter reading system of the electronic card.

3. The fluid meter as claimed in claim 2, additionally comprising a sealing joint inserted between the metal insert and the upper transparent panel.

4. The fluid meter as claimed in claim 3, wherein the sealing joint is overmoulded on the cover.

5. The fluid meter as claimed in claim 3, additionally comprising a second sealing joint inserted between the cover and the cap.

6. The fluid meter as claimed in claim 5, wherein the sealing joint and the second sealing joint are overmoulded on the cover by means of a channel connecting them.

7. The fluid meter as claimed in claim 2, wherein the screw is connected by a spring-loaded contact to the remote meter reading system of the electronic card.

8. The fluid meter as claimed in claim 4, additionally comprising a second sealing joint inserted between the cover and the cap.

9. The fluid meter as claimed in claim 8, wherein the sealing joint and the second sealing joint are overmoulded on the cover.

10. The fluid meter as claimed in claim 3, wherein the screw is connected by a spring-loaded contact to the remote meter reading system of the electronic card.

11. The fluid meter as claimed in claim 1, wherein the screw is connected by a spring-loaded contact to the remote meter reading system of the electronic card.

12. The fluid meter as claimed in claim 5, wherein the screw is connected by a spring-loaded contact to the remote meter reading system of the electronic card.

13. The fluid meter as claimed in claim 6, wherein the screw is connected by a spring-loaded contact to the remote meter reading system of the electronic card.

14. The fluid meter as claimed in claim 8, wherein the screw is connected by a spring-loaded contact to the remote meter reading system of the electronic card.

15. The fluid meter as claimed in claim 9, wherein the screw is connected by a spring-loaded contact to the remote meter reading system of the electronic card.

16. A fluid meter, comprising:
    a totaliser to determine a volume of fluid;
    an electronic card to send data, obtained at least in part by operation of the totaliser, via radio transmission;
    a metal housing to contain the totaliser;
    a transparent panel to cover the totaliser within the metal housing in a leak-proof manner;
    a cover to retain the upper transparent panel in the leak-proof manner;
    a cap to cover the cover; and
    an antenna located between the cover and the cap;
    wherein the transparent panel and the cover both include a respective aperture through which is disposed a watertight arrangement for transmission from the electronic card to the antenna, the watertight arrangement comprising a metal insert secured on the upper transparent panel by a fastener.

17. The fluid meter of claim 16, wherein the transparent panel is made from glass.

18. The fluid meter of claim 16, wherein the cap is made from plastic material.

19. The fluid meter of claim 16, wherein the watertight arrangement for transmission additionally comprises a metal spring-loaded contact at a first end of the screw and the metal insert to clamp onto the antenna on a second end of the screw.

20. The fluid meter of claim 19, wherein the metal spring-loaded contact provides electrical connectivity between the electronic card and the screw.

\* \* \* \* \*